United States Patent
Wu et al.

(10) Patent No.: US 7,302,372 B1
(45) Date of Patent: Nov. 27, 2007

(54) TECHNIQUE FOR OPTIMIZATION OF A SIMPLIFIED NETWORK MODEL

(75) Inventors: Zheng Y. Wu, Watertown, CT (US); Wayne R. Hartell, Golden Grove (AT); Jack S. Cook, Jr., Bethlehem, CT (US); Robert F. Mankowski, Watertown, CT (US); Gregg A. Herrin, Burlington, CT (US)

(73) Assignee: Bentley Systems, Incorporated, Exton, PA (US)

( * ) Notice: Subject to any disclaimer, the term of this patent is extended or adjusted under 35 U.S.C. 154(b) by 711 days.

(21) Appl. No.: 10/457,120

(22) Filed: Jun. 9, 2003

Related U.S. Application Data

(60) Provisional application No. 60/388,391, filed on Jun. 13, 2002.

(51) Int. Cl.
  *G06G 7/48* (2006.01)
  *F16L 9/00* (2006.01)
  *G06T 11/20* (2006.01)
(52) U.S. Cl. .......................... 703/9; 138/178; 345/440
(58) Field of Classification Search ..................... 703/9
  See application file for complete search history.

(56) References Cited

OTHER PUBLICATIONS

Halhal et al., "Water Network Rehabilitation with a Structured Messy Genetic Algorithm" 1997. Journal of Water Resources Planning and Management, vol. 123, No. 3, p. 137-146.*
Anderson- J.L., "Modeling Trio used for Distribution System Analysis" 1987, Water/Engineering Management p. 25-28.*
Boulos, Paul F. et al. Explicit Calculation of Pipe-Network Parameters. Journal of Hydraulic Engineering, vol. 116, No. 11, Nov. 1990, ASCE., 1326-1345.
Wu, Zheng Yi et al. Calibrating Water Distribution Model via Genetic Algorithms. AWWA IMTech Conference, Apr. 14-16, 2002, Kansas City, MO., 1-10.
Wu, Zheng Yi et al. Using Genetic Algorithms to Rehabilitate Distribution Systems. Nov. 2001, Journal AWWA., p. 74-85.
Wu, Zheng Yi et al. Optimal Capacity Design of Water Distribution Systems, 1st ASCE Annual Environmental and Water Resources System Analysis (EWRSA) Symposium, May 19-22, 2002, Roanoke, VA., 1-9.
Zitzler, Eckart et al. Evolutionary Algorithm Based Exploration of Software Schedules for Digital Signal Processors, Genetic and Evolutionary Computation Conference, Orlando, FL, Jul. 1999., 1-8.

* cited by examiner

*Primary Examiner*—Anthony Knight
*Assistant Examiner*—Tom Stevens
(74) *Attorney, Agent, or Firm*—Cesari and McKenna LLP

(57) ABSTRACT

A method and system for optimization of a simplified engineering model is provided. A software tool efficiently simplifies an engineering model such as a water distribution system and preserves the hydraulic accuracy of the simplified model. The system includes a software program that employs a genetic algorithm to evolve solutions for reinstating the behavior of the original network into a simplified network. The genetic algorithm can be used for identifying the less sensitive hydraulic elements (links and nodes), and removing them or replacing them with the best-fit element parameters produced by the genetic algorithm module of the present invention. A element-by-element skeletonization approach generates the layout of a skeleton network and then identifies potential equivalent elements for replacing series pipes and loops. Yet another alternative includes taking a skeleton network model, and using the techniques of the present invention, optimizes the demand distribution and pipe conductance of the skeletonized model.

14 Claims, 3 Drawing Sheets

TECHNIQUE FOR OPTIMIZATION OF A SIMPLIFIED NETWORK MODEL

CROSS-REFERENCE TO RELATED APPLICATIONS

The present application claims the benefit of U.S. Provisional Patent Application Ser. No. 60/388,391, which was filed on Jun. 13, 2002, by Zheng Y. Wu et al. for TECHNIQUE FOR OPTIMIZATION OF A SIMPLIFIED NETWORK MODEL, and is hereby incorporated by reference.

BACKGROUND OF THE INVENTION

1. Field of the Invention

This invention relates generally to engineering modeling software, and particularly, to simplification of engineering models.

2. Background Information

Simplification of engineering models, and in an illustrative case, a water distribution system, has been an essential process to establishing a sound computer model that represents the physical and hydraulic characteristics of the water system. This is primarily due to the large size of a real water system and the use of a computer model to simulate the system. A water distribution system usually consists of hundreds of thousands of hydraulic elements including pipes, valves, pumps, tanks and reservoirs. It is not possible or necessary to include every element in the computer model. For instance, an operation manager (as opposed to a design engineer, for example) is typically concerned about how to operate the control components, such as pumps and valves, rather than the pressures at every junction, to meet the water supply requirement at the minimum energy cost, thus an operation model needs to be built to capture the characteristics of system operation, but does not need to include every single pipe line. Therefore, effectively simplifying a hydraulic network is essential to achieving a sound computer model representation of a real system and a more efficient approach for water distribution modeling.

Conventionally, there have been two approaches developed for network simplification, namely, element-by-element and parameter-fitting simplification. The former approach proceeds element-by-element by applying the techniques of data scrubbing, branch trimming, series pipe removal, parallel pipe replacement, and equivalent pipe for loop replacement to reduce the size of an original water distribution system to a manageable dimension. This is often referred to as "skeletonization." These processes can be repeated until the desired simplicity is reached. Skeletonization can be guided by heuristic rules including shifting the small diameters and replacing the adjacent nodes of similar pressures with one node. However, these heuristics have not always preserved the integrity and hydraulic accuracy of a network. Thus, the resulting simplified network model does not behave in a manner consistent with the original network model.

An exact simplification cannot typically be achieved by applying an element-by-element approach, even for a simple system. In addition, it would be preferable to provide a method of verifying the final accuracy of the simplified network that resulted from the stepwise skeletonization.

There remains a need, therefore, for a method and system that provides a simplified model, but which maintains the integrity of the network while accurately reinstating the hydraulic behavior of the original network, and allowing for verification of the accuracy of the simplification.

It is thus an object of the present invention, to provide a parameter-fitting approach to hydraulic network simplification to improve the overall results of the simplification and to overcome the limitations of element-by-element simplification.

SUMMARY OF THE INVENTION

The disadvantages of prior techniques have been overcome by the solutions of the present invention in which a method and system for optimization of a simplified engineering model is provided. The invention provides a software tool for efficiently simplifying an engineering model such as a water distribution system and for preserving the hydraulic accuracy of the simplified model.

More specifically, in the hydraulic network environment, the invention includes a method and system for optimization of a simplified engineering model, including a software tool for efficiently simplifying an engineering model such as a water distribution system and for preserving the hydraulic accuracy of the simplified model. The system includes a software program that employs a genetic algorithm to evolve solutions for reinstating the behavior of the original network into the simplified network. The genetic algorithm can be used for identifying the less sensitive hydraulic elements (links and nodes), and removing them or replacing them with the best-fit element parameters produced by the genetic algorithm module of the present invention. An alternative aspect of the invention includes using an element-by-element skeletonization approach to generate the layout of a skeleton network and then identifying potential equivalent elements for replacing series pipes and loops, using the method of the present invention. Yet another alternative includes taking a skeleton network model, produced by any means, and using the techniques of the present invention to optimize the demand distribution and pipe conductance of the skeletonized model.

In addition, the method of the present invention includes optimizing the layout of a simplified model by identifying and removing the elements that have the least influence on the system hydraulic response, and optimizing the demand distribution, and optimizing the pipe conductance, which as used herein includes a combination of pipe roughness and pipe diameter.

The optimization process is used, in part, to minimize the discrepancy between the original model simulation and the simplified model simulation under multiple loading and boundary conditions. As noted, the optimization process employs a competent genetic algorithm to perform these steps.

BRIEF DESCRIPTION OF THE DRAWINGS

The invention description below refers to the accompanying drawings, of which.

DETAILED DESCRIPTION OF AN ILLUSTRATIVE EMBODIMENT

For a better understanding of the invention, a brief description of a water distribution network model is provided. It should be understood, however, that the invention may be utilized with other hydraulic and hydrological engineering modeling systems that describe urban and rural sanitary, storm, drainage, river, retention and detention basin network systems.

Briefly, a water distribution network designer has many decisions to make concerning the network. A tool for making those decisions is the network model that simulates network behavior. A method and system for storing data associated with a hydraulic network inter alia was described in commonly-owned U.S. patent application Ser. No. 10/145,841, filed on May 14, 2002, by Sasa Tomic et al., for a METHOD AND SYSTEM FOR THE STORAGE AND USE OF ENGINEERING MODELING ALTERNATIVES WITH UNITIZED DATA, now issued U.S. Pat. No. 7,107,280, which is presently incorporated herein by reference.

Figure 1A:
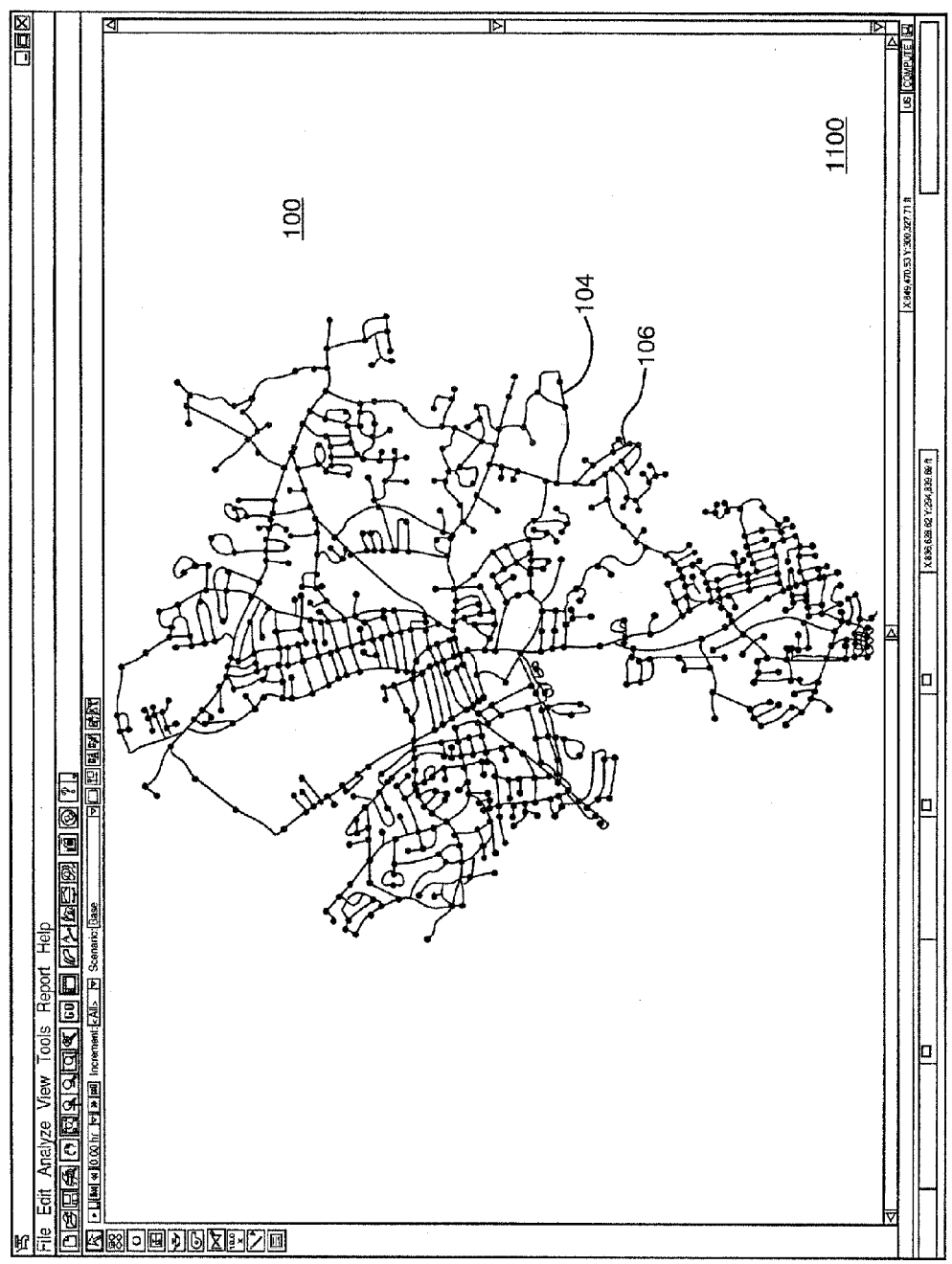
FIG. 1A is a screen shot of a water distribution network that may be simplified and optimized using the software program of the present invention, prior to simplification.

FIG. 1A is a schematic screen shot (of a graphic user interface0 (GUI) employed as part of the present invention in which a water distribution network 100 is depicted schematically. The water distribution network has individual main lines 104, 106, which may include ten-inch diameter pipes, eight-inch diameter pipes, and other hydraulic components. Within the network, a number of pump stations, and valves (not shown) will also be in operation to move and control the flow of water in the network. The pipes, valves and pumps are sometimes collectively referred to herein as "links" and the junctions are sometimes referred to herein as "nodes." The components in general are referred to as "elements." The network 100 is the subject of the "original model", prior to simplification.

Figure 1B:
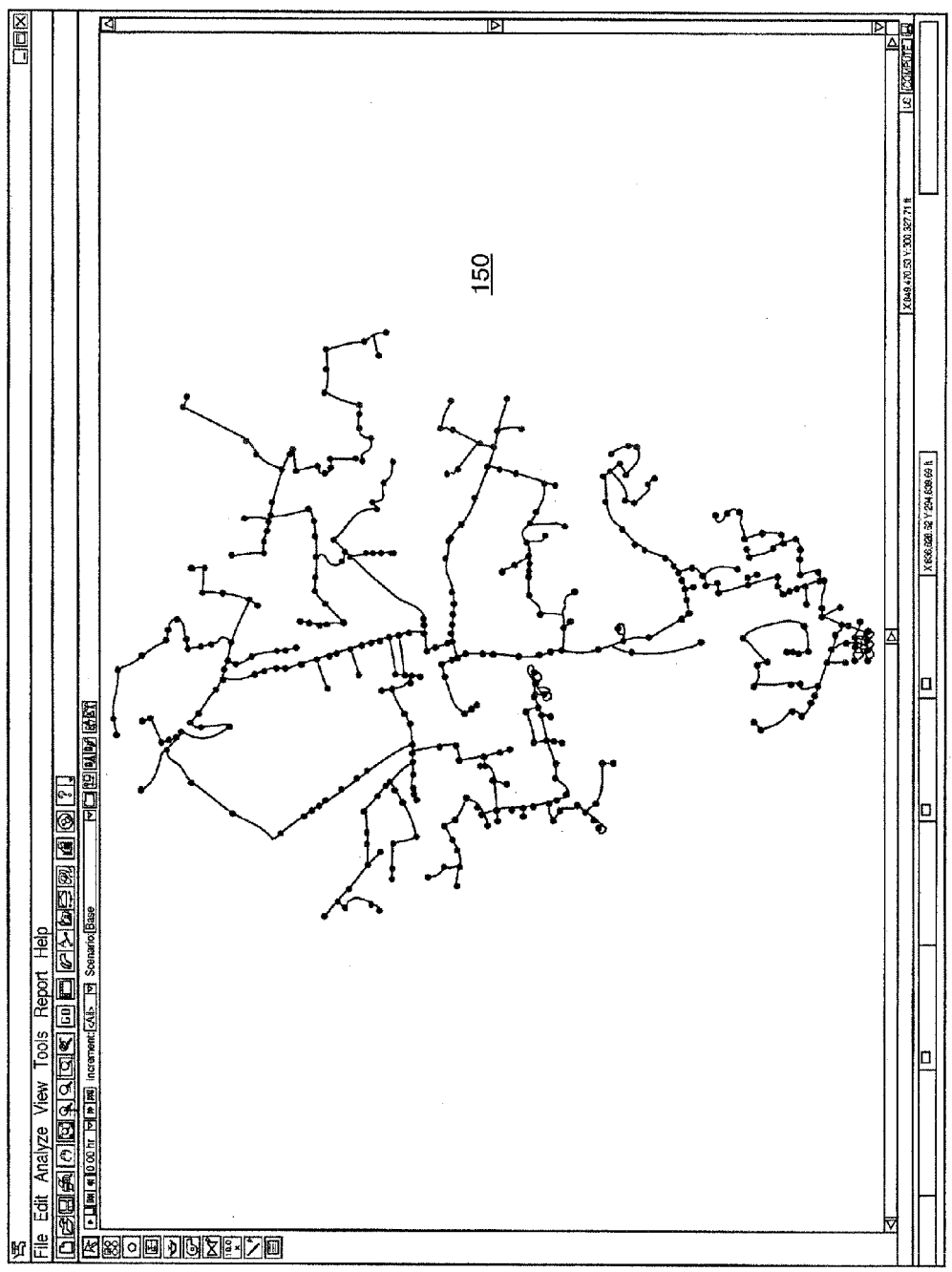
FIG. 1B is a screen shot of a water distribution network that may be simplified and optimized using the software program of the present invention, after simplification.

As noted, a water distribution system usually consists of hundreds of thousands of hydraulic elements including pipes, valves, pumps, tanks and reservoirs. It is not necessary to include every element in a model when evaluating the operation of the network using the model. Thus, the model is simplified. An illustration of a simplified model 150 is shown in FIG. 1B. However, the hydraulic network simplification needs to be conducted in such a manner that the accuracy between the original model FIG. 1A, and that of the simplified model FIG. 1B is to maintained.

More specifically, the objective of a useful model simplification and optimization, in accordance with the present invention, is to improve the model accuracy defined as a difference between the original and simplified model simulation. The original model is simulation results can be obtained from the original model FIG. 1A as a first step. In accordance with a preferred embodiment of the invention, both flow accuracy and head accuracy are maintained to achieve the overall model accuracy.

To ensure the consistent hydraulic behavior of a simplified model (FIG. 1B) with the pre-simplified (FIG. 1A), both flow and head can be 'measured' at important control elements including tanks, reservoirs, pumps, flow control valves, user-defined sensitive links and nodes. Equivalent elements produced by the program of the present invention can be subjected to measurements when the skeletonization program is run. As many of these measurements can be obtained as desired to meet solution accuracy by conducting the hydraulic runs of an original model before the simulation and optimization process is initiated.

Figure 2:
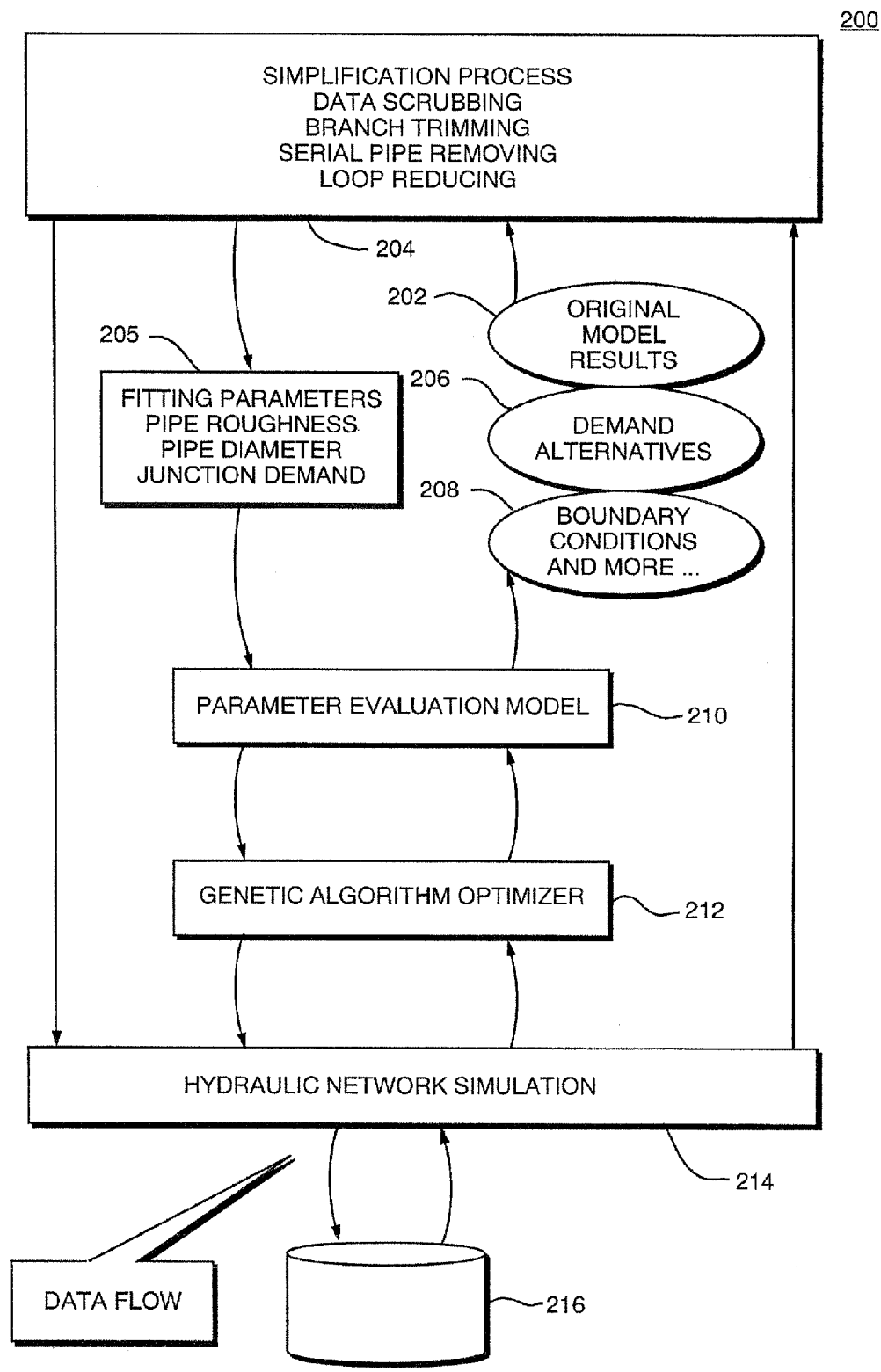
FIG. 2 is a schematic illustration of the software application and data flow in accordance with the present invention.

The system of the present invention accomplishes these objectives using the software architecture illustrated in FIG. 2. FIG. 2 is a schematic illustration of the software architecture 200 including the data flow through software modules using the applications and user interfaces embodying the present invention. Using the applications and interfaces a water engineer can take those factors mentioned herein into account in simplifying a water distribution network, and optimizing the simplified network.

A user interface on a personal computer or other workstation lends the user the ability to enter the information for each element (junction or pipe) in the network to be simplified and to select simplification criteria for those elements. The original network has original model results 202. Then, the model is simplified using one or more of the simplification techniques such as element-by-element including data scrubbing, branch trimming, series pipe removal, parallel pipe removal, and loop reducing, 204 or parameter fitting techniques, 205. Further details regarding each of these steps are provided in commonly-owned U.S. patent application Ser. No. 10/190,651, filed on Jul. 8, 2002, by Wayne R. Hartell et al., entitled METHOD AND SYSTEM FOR REDUCTION OF A NETWORK TOPOLOGY-BASED SYSTEM HAVING AUTOMATED OPTIMIZATION FEATURES, now issued U.S. Pat. No. 7,054,799, which is presently incorporated herein by reference. Next, the engineer continues to design the simplified model of the water distribution network and in doing so the user may select demand alternatives 206 (and other parameters such as pipe size and link status), as well as boundary conditions 208.

The next step in accordance with the invention is to implement selected parameters into the simplified model by the software program using the parameter evaluation model, as illustrated in block 210.

A genetic algorithm module 212 next optimizes the simplified model by searching for the best equivalent alternatives. Briefly, a genetic algorithm is a known model of machine learning, which is derived from a metaphor of the processes of evolution in nature. This is done by the creation (within a machine) of a population of individuals represented by chromosomes. In essence, it includes a set of character strings that is analogous to the base 4 chromosomes seen in DNA. The individuals then go through a process of evolution. Genetic algorithms can be used for an application to obtain a multi-dimensional optimization of a problem in which a character string (the chromosome) can be used to encode values for different parameters being optimized. By way of example, and for purposes of further illustration, a genetic algorithm can be used to calibrate a network model as described in commonly-owned U.S. patent application Ser. No. 10/051,820, filed Jan. 17, 2002, by Zheng Wu et al. for a METHOD AND SYSTEM FOR AUTOMATIC WATER DISTRIBUTION MODEL CALIBRATION, which is presently incorporated herein by reference. In addition, a genetic algorithm can be used to design a hydraulic system as described in commonly-owned U.S. patent application Ser. No. 10/379,353, filed Mar. 4, 2003, by Zheng Y. Wu et al. for a METHOD FOR OPTIMAL DESIGN AND REHABILITATION OF WATER DISTRIBUTION SYSTEMS, which is presently incorporated herein by reference.

In the present invention, the genetic algorithm program, among other things, generates a population of trial solutions of a simplified water distribution network. Each trial solution is then presented to a hydraulic network simulation module 214 to perform a hydraulic simulation of the simplified hydraulic network. The hydraulic network simulation module 214 embodies a hydraulic network solver that runs a hydraulic simulation using data in a data model 216 to suggest the optimal representation for the network 100. This information is passed back to the parameter evaluation module 210 of the present invention to evaluate the solutions according to user-specified criteria.

In addition, in accordance with the present invention, the demand may be redistributed to the simplified model. It is preferred that the total redistribution demand is equal to the original system demand.

In performing the simplification and optimization process of the present invention, the method of the present invention integrates the element-by-element simplification and parameter fitting simplification techniques. The method of the present invention includes identifying the less sensitive hydraulic elements (links and nodes), and removing them or replacing them with the best-fit element parameters produced by the genetic algorithm module of the present invention. The invention also includes using element-by-element skeletonization approach to generate the layout of a skeleton network and then identifying potential equivalent elements replacing series pipes and loops, using the method of the present invention. The parameters of equivalent pipes and connected nodes can be computed by using pre-simplified simulation results. In addition, the software of the present invention includes a skeleton network model, produced by any means, and using the techniques of the present invention to optimize the demand distribution and pipe conductance of the skeletonized model.

It should be understood that the genetic algorithm-based program of the present invention enables a user to iteratively simplify a hydraulic network, and also to optimize the parameters to maintain the model accuracy of a simplified model.

Furthermore, the topology of a simplified network can be created using an element-by-element approach and/or careful engineering judgement. By applying efficient genetic-evolutionary optimization techniques, a user will be able to rapidly evaluate the best-fit pipe conductance, optimal demand distribution and also the optimal layout of a simplified network. A user can also apply the approach to an extreme simplification case, such as a few pipes replacing a whole pressure zone. In addition, the method and system of the present invention is useful for producing a schematic system for on-line operation optimization, which may be required for a large number of Extended Period Simulation (EPS) runs in a short period of time. In this way, the method and system of the present invention, evolves an accurate hydraulic network representation to the simplification, as desired.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A method of optimizing an engineering model of a hydraulic network, including the steps of:
   (A) simplifying the model by identifying less sensitive hydraulic elements being elements that have a least influence on hydraulic responses in the network;
   (B) employing a genetic algorithm to generate best-fit element parameters for replacing the identified, less sensitive hydraulic elements;
   (C) replacing such elements with said best-fit element parameters to generate a simplified model;
   (D) employing said genetic algorithm to generate a population of trial solutions of a simplified hydraulic network;
   (E) presenting each trial solution generated to an associated hydraulic simulation program;
   (F) determining demand for the original model and redistributing the demand to the simplified model;
   (G) optimizing pipe conductance including a combination of pipe roughness and pipe diameter;
   (H) running a hydraulic simulation; and
   (I) suggesting an optimal representation for the network.

2. The method as defined in claim 1 including the further step of removing predetermined less sensitive hydraulic elements that have small impact on accuracy of simulation results at user-selected nodes and pipes.

3. A method of evaluating a simplification of a hydraulic network model including the steps of:
   (A) generating original model simulation results by measuring both flow and head at predetermined control elements;
   (B) producing equivalent elements to replace predetermined elements using a genetic algorithm;
   (C) generating a simplified network model based on said original model;
   (D) performing measurements at equivalent elements produced by the genetic algorithm; and
   (E) comparing the measurements taken from the original model before the simplification and the measurements determined by the genetic algorithm.

4. The method as defined in claim 3 including the further step of evaluating consistency between hydraulic behavior of a simplified model with an original model.

5. The method as defined in claim 3 including the further step of using as said parameters at least one of the following:
   (A) pipe roughness;
   (B) pipe diameter; and
   (C) junction demand.

6. The method as defined in claim 3 including the further step of simplifying the network by selecting a simplification process being at least one or more of the following:
   (A) data scrubbing;
   (B) branch trimming;
   (C) series pipe removing; and
   (D) loop reducing.

7. A system embodied in a software program for optimizing a simplified hydraulic network, comprising:
   (A) means for generating a hydraulic simulation of an original hydraulic network model based on data in an associated database;
   (B) means for simplifying the original model;
   (C) means for introducing parameters based on user-defined criteria for said simplified model;
   (D) means for genetic algorithm optimization for employing a genetic algorithm to determine best-fit parameters for said simplified model; and
   (E) means for comparing the measurements taken from the original model before the simplification and the measurements determined by the genetic algorithm.

8. The system as defined in claim 7 wherein said genetic algorithm optimization means further comprises means for generating equivalent elements to replace selected elements from said original model.

9. The system as defined in claim 7 wherein said parameter means includes determining parameters associated with said equivalent elements.

10. The system as defined in claim 7 further comprising means for identifying the less sensitive hydraulic elements being elements that have the least influence on hydraulic responses in the system, in said original model and replacing them with best-fit element parameters produced by said genetic algorithm optimization means.

11. The system as defined in claim 7 further comprising
(A) means for using element-by-element skeletonization techniques to generate a layout of a skeletonized hydraulic network; and
(B) means for identifying potential equivalent elements for replacing series pipes and loops using said genetic algorithm optimization means.

12. The system as defined in claim 7 further comprising means for taking a preexisting skeletonized network model and using said genetic algorithm optimization means to optimize demand distribution of said skeletonized model.

13. The system as defined in claim 7 further comprising means for taking a preexisting skeletonized network model and using said genetic algorithm optimization means to optimize pipe conductance of said skeletonized model.

14. The system as defined in claim 7 further comprising said genetic algorithm optimization means including means for optimizing pipe conductance including a combination of pipe roughness and pipe diameter.

* * * * *